Dec. 17, 1929.　　　C. N. NEKLUTIN　　　1,739,516

MATCH MAKING MACHINE

Filed Jan. 15, 1927　　12 Sheets-Sheet 1

Inventor:

Constantine N. Neklutin,

By Hugh K. Wagner

Attorney.

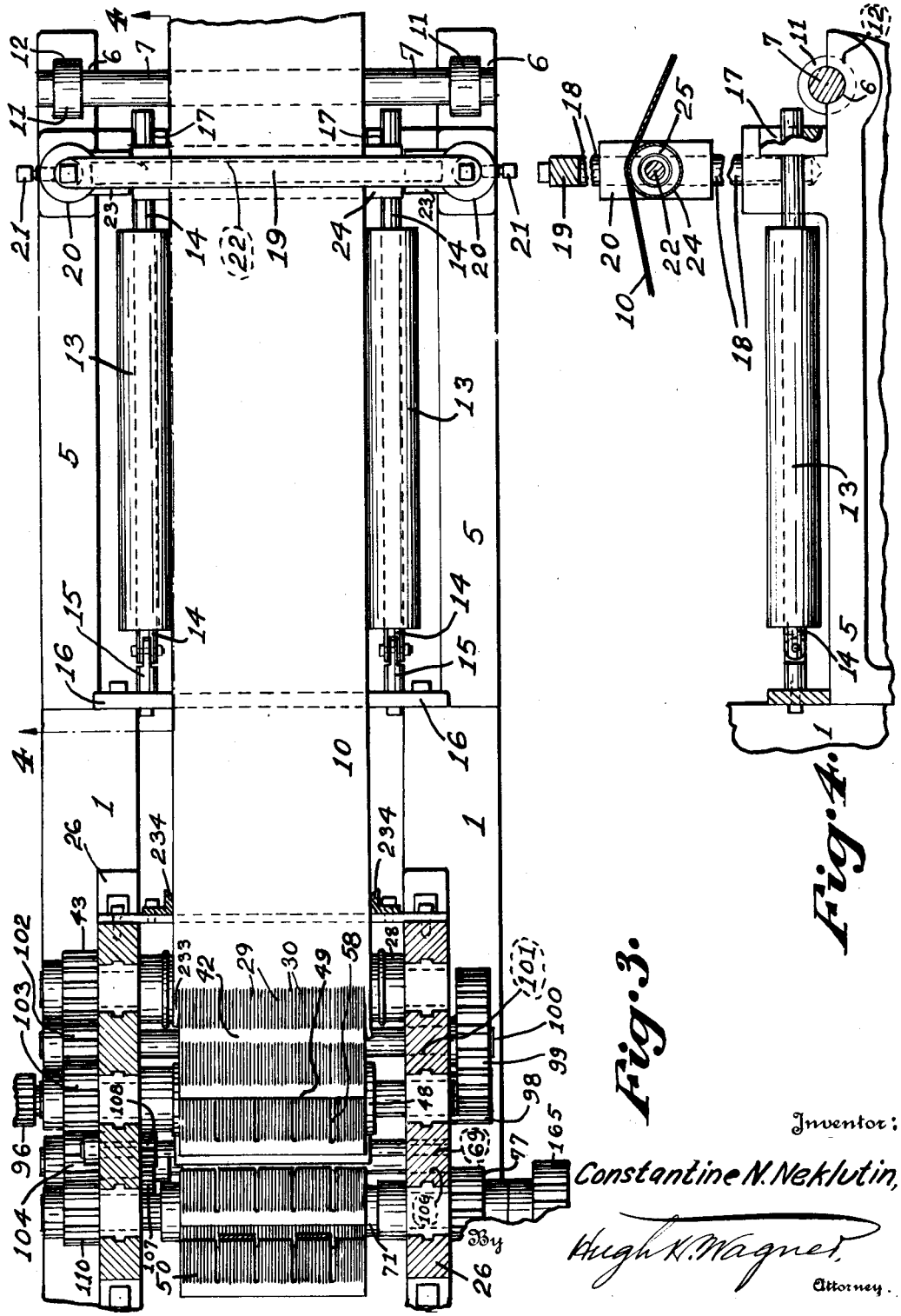

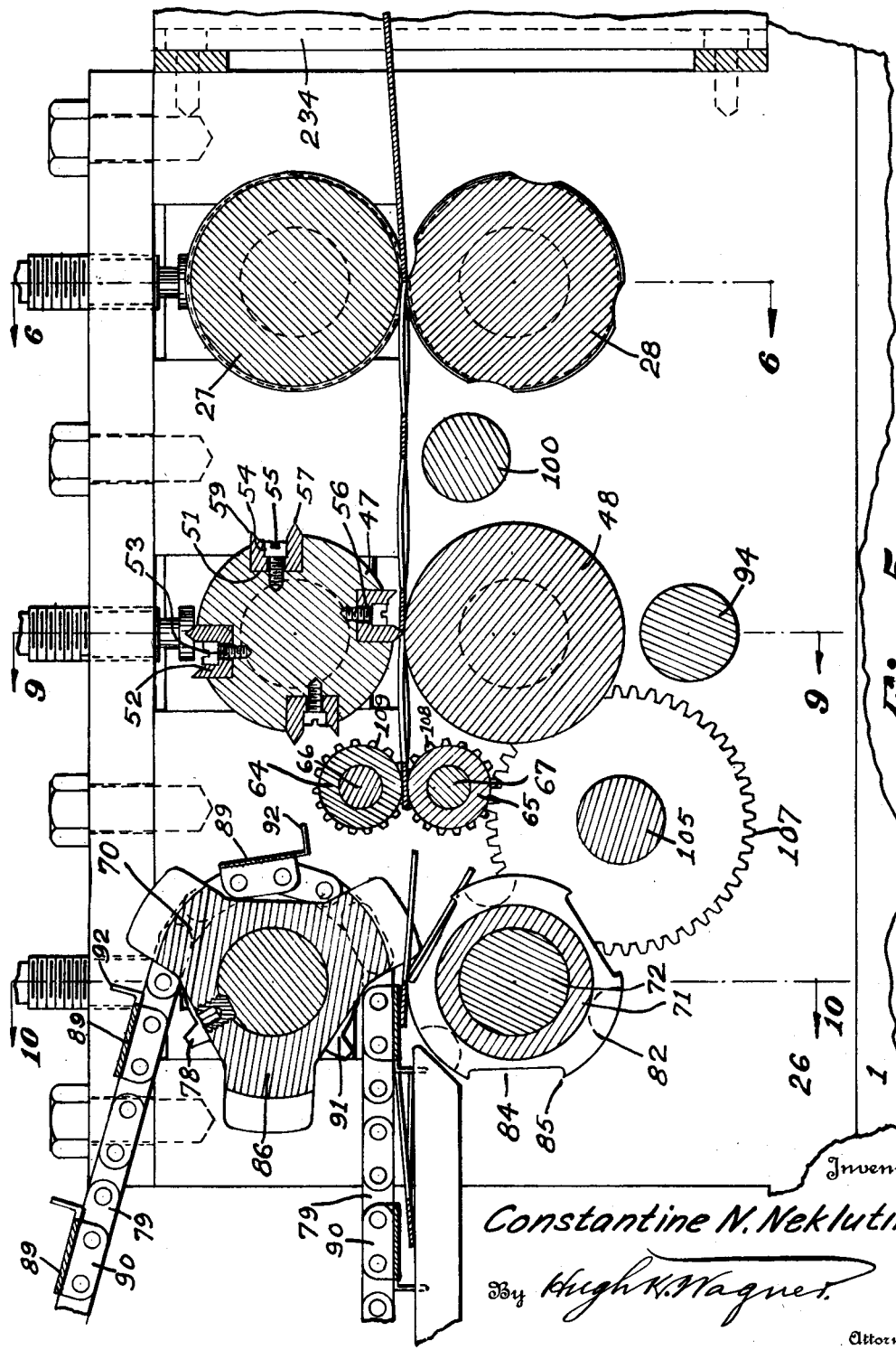

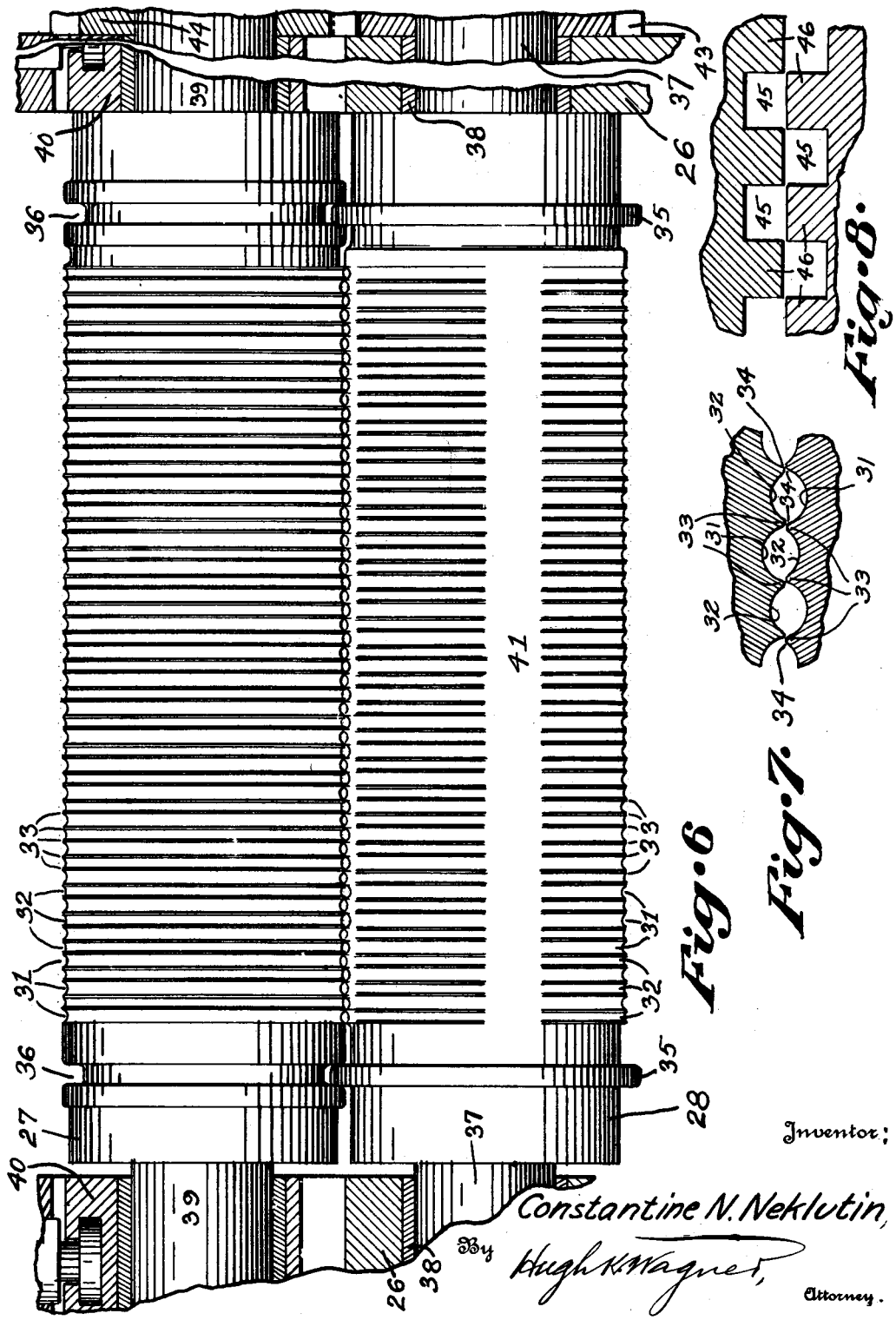

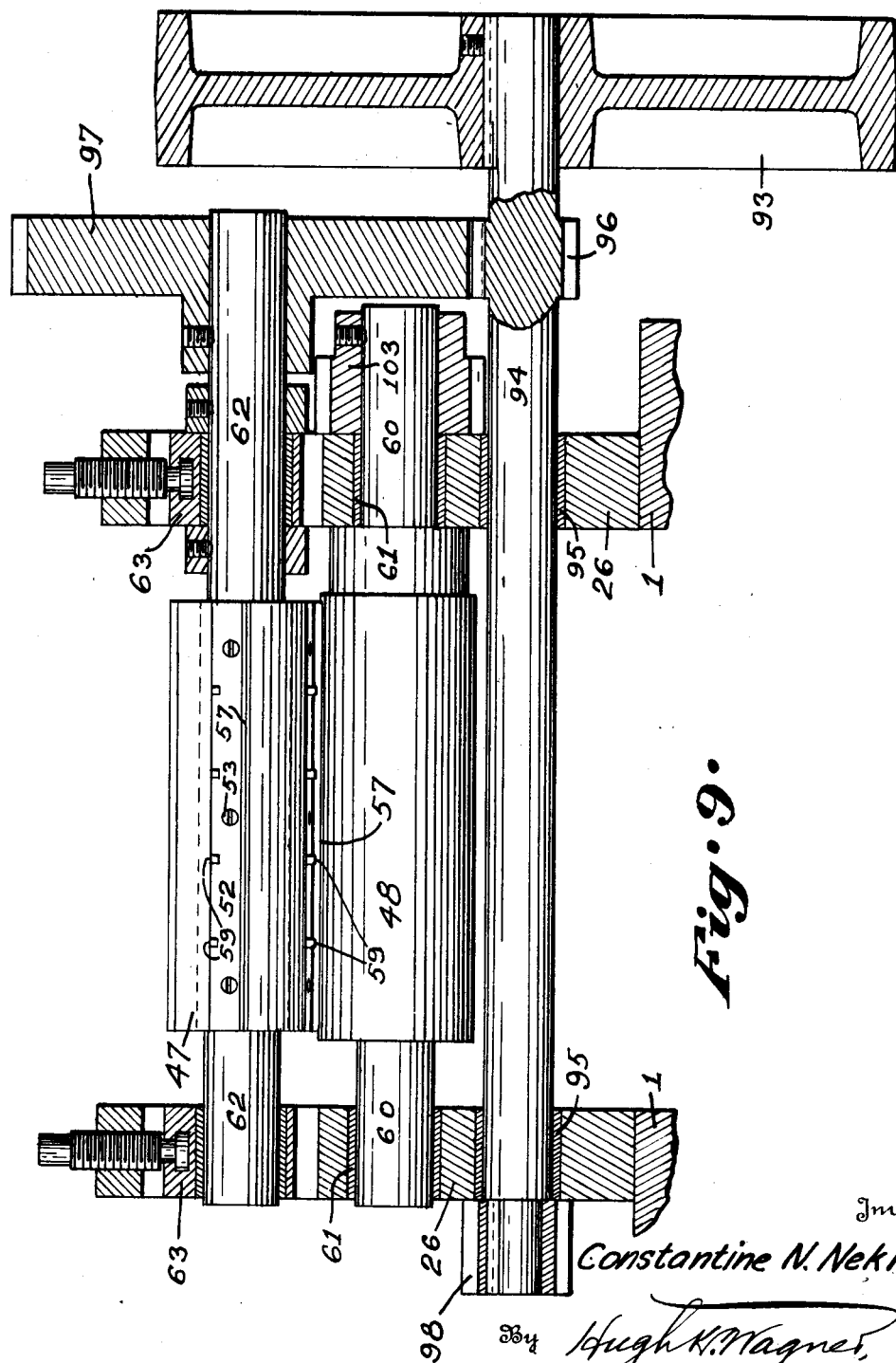

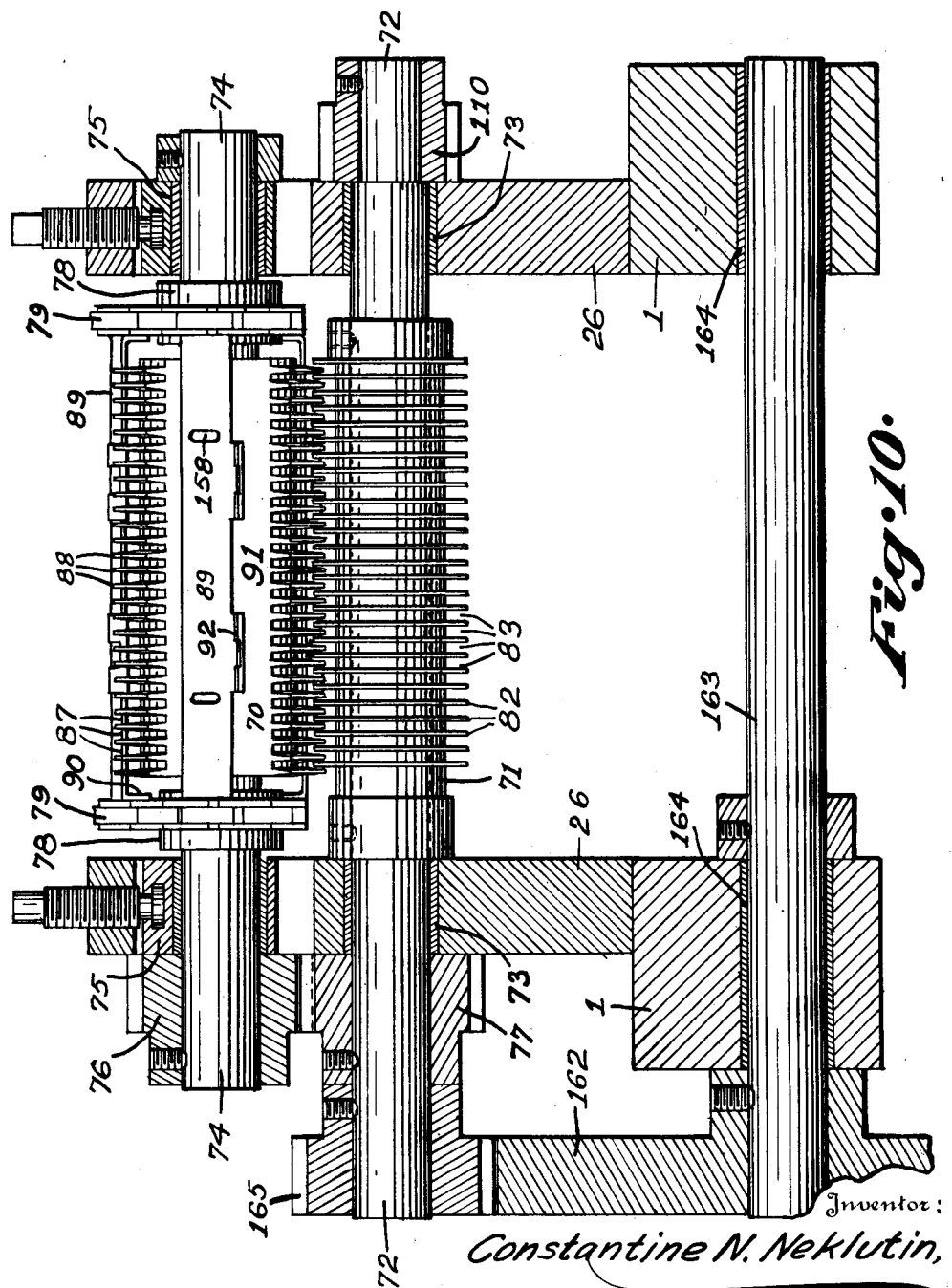

Dec. 17, 1929.   C. N. NEKLUTIN   1,739,516
MATCH MAKING MACHINE
Filed Jan. 15, 1927   12 Sheets-Sheet 7
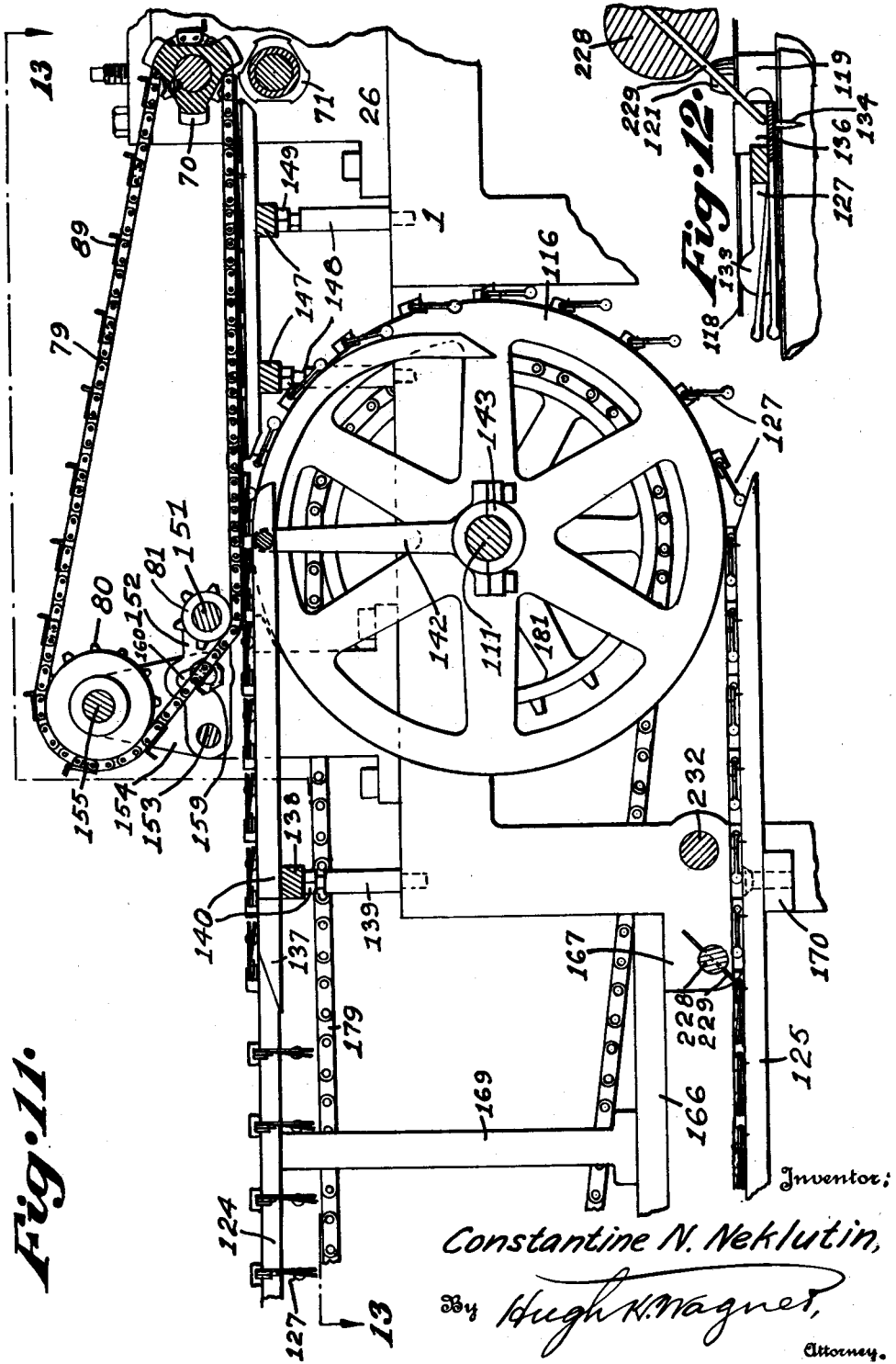
Inventor:
Constantine N. Neklutin,
By Hugh K. Wagner,
Attorney.

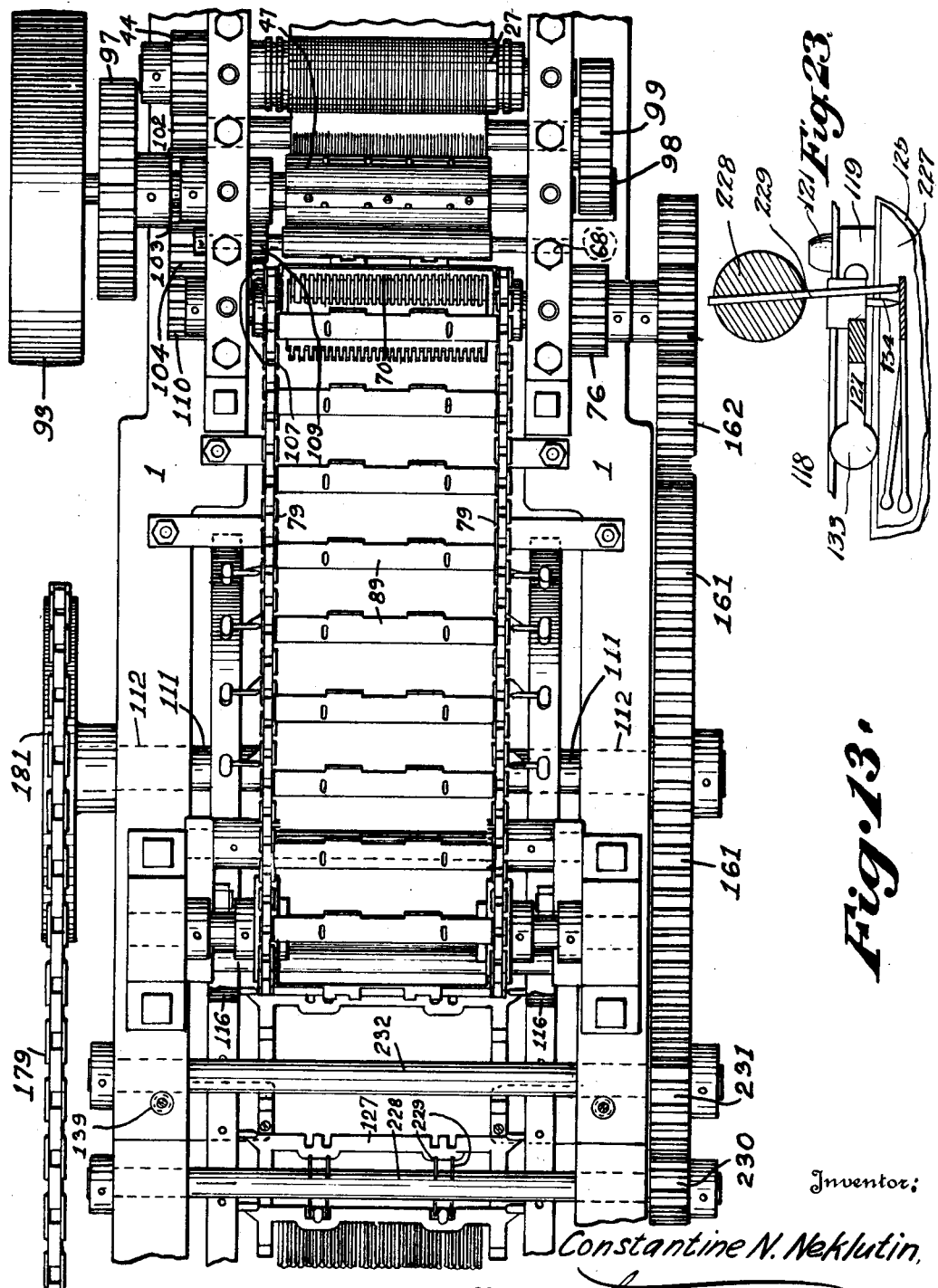

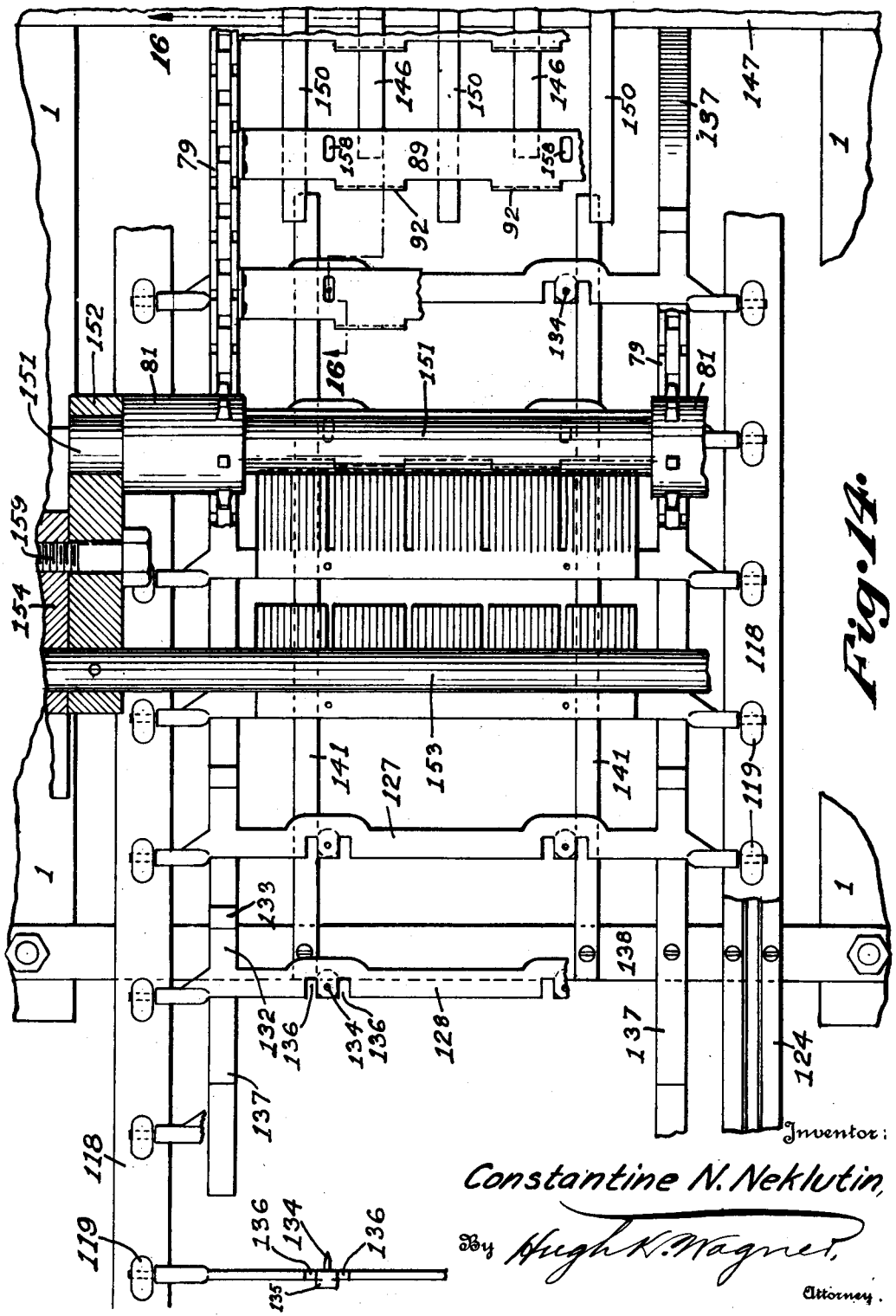

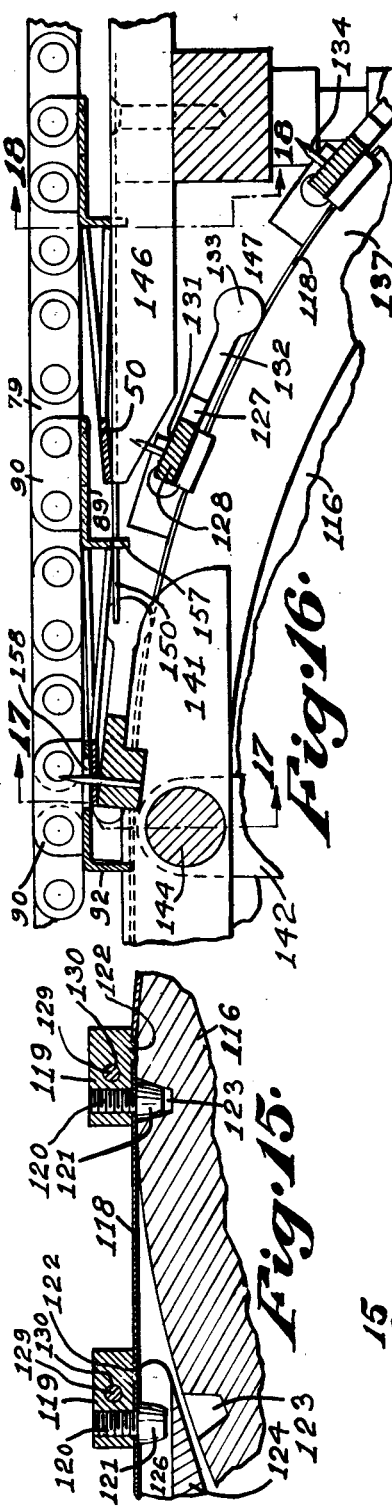

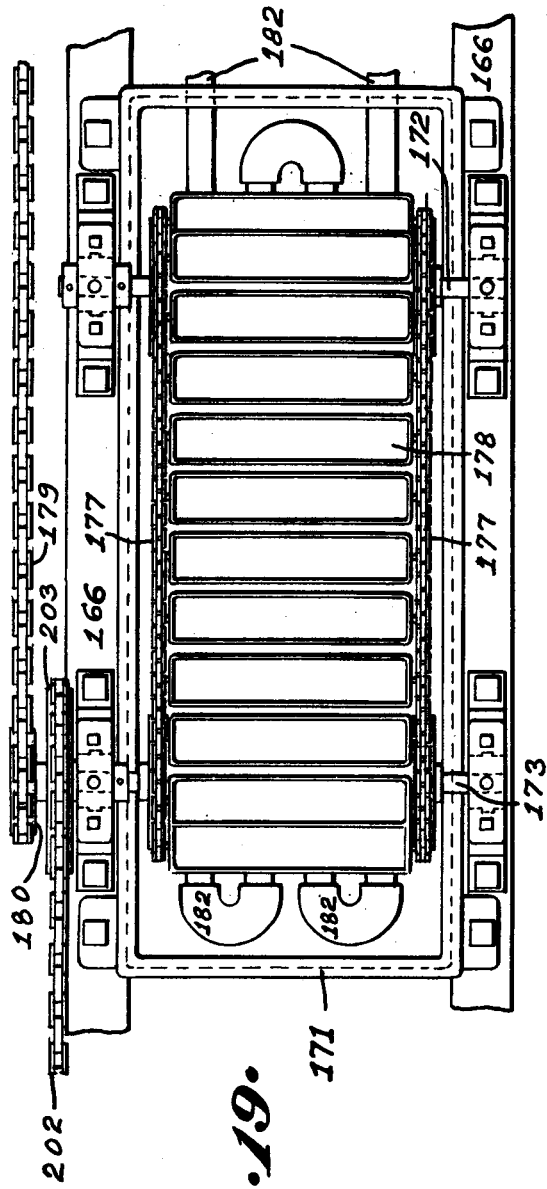

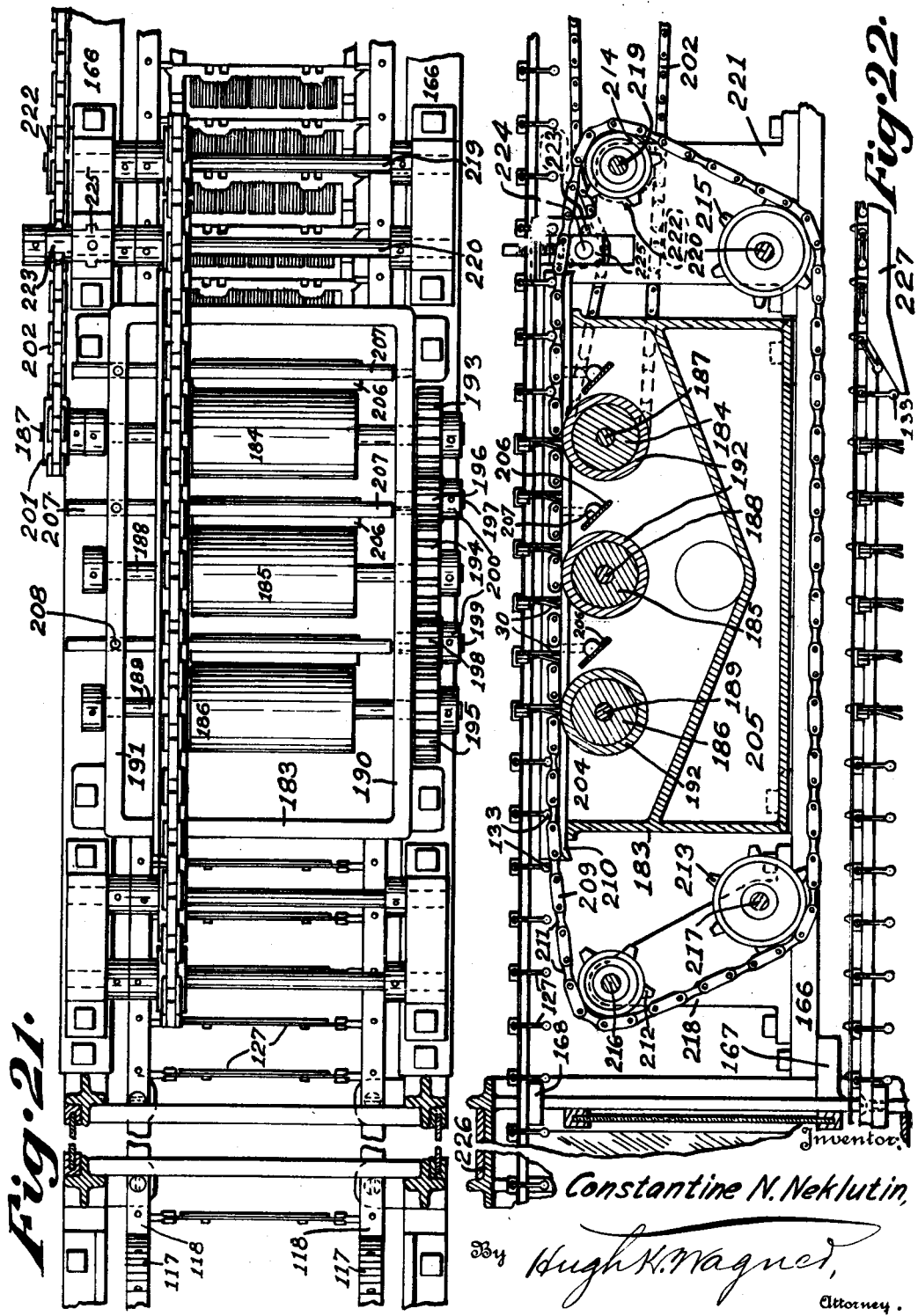

Patented Dec. 17, 1929

1,739,516

UNITED STATES PATENT OFFICE

CONSTANTINE N. NEKLUTIN, OF ST. LOUIS, MISSOURI, ASSIGNOR, BY MESNE ASSIGNMENTS, TO THE UNIVERSAL MATCH CORPORATION, A CORPORATION OF DELAWARE

MATCH-MAKING MACHINE

Application filed January 15, 1927. Serial No. 161,294.

This invention relates to match-making machines, and has more particular reference to a machine for making card or comb matches, or match-book leaves that may be assembled into book form, although certain features of the invention pertain to matchmaking machines generally.

The primary object of the present invention is to provide a machine of the character described in which the leaves and the stock or strip of material from which they are produced move continuously through the machine while being cut, spread, paraffined, coated with ignition composition, dried and ejected automatically from the machine.

Another object is the provision of improved cutting means that does not become dull as easily and, therefore, does not require resharpening as frequently as that hitherto in use.

Another object is to provide a conveyor for carrying the leaves from the forming means and which will be lighter and simpler, and will operate with less friction than prior types of match conveyors.

Another object is to provide improved means for positively transferring the leaves from the forming means to predetermined positions on the said conveyor.

Another object is to provide simplified means for treating the ends of the match blanks uniformly with ignition composition and all parts of which will be readily accessible and easily kept clean.

Other objects and advantages, more or less ancillary to the foregoing, will appear in the course of the following description of a preferred embodiment of the invention.

While the invention includes the combined instrumentalities above mentioned, it is to be understood that the aforesaid means are believed to be not only combinatively novel, but certain of the devices going to make up such means are new in less combinations than the whole, and some are capable of individual use as will more clearly appear hereinafter.

In the accompanying drawings forming part of this specification, in which like numbers of reference denote like parts wherever they occur, Figure 1 is an elevation of the complete machine;

Figure 3 is a plan view, partly in section, of that portion of the machine shown at the extreme right in Figure 1 and taken on the line 3—3 thereon;

Figure 4 is a fragmentary sectional view taken on the line 4—4 in Figure 3, of the means shown in Figure 3 for supporting and guiding the roll of paper or leaf stock;

Figure 5 is a vertical longitudinal sectional view through the mechanism for forming the leaves from the stock, looking toward the machine in the same direction as in Figure 1;

Figure 6 is a fragmentary vertical transverse sectional view taken on the line 6—6 in Figure 5, showing in elevation the rolls for incising the strip of leaf stock longitudinally to form the individual match blanks;

Figure 7 is a fragmentary longitudinal vertical central sectional enlargement view through the rolls of Figure 6, showing their manner of meeting;

Figure 8 is a similar view showing a modified form of the rolls of Figures 6 and 7;

Figure 9 is a vertical transverse sectional view taken on the line 9—9 in Figure 6, showing in elevation the rolls for incising the strip of leaf stock transversely to define the leaves or groups of individual match blanks;

Figure 10 is a vertical transverse sectional view taken on the line 10—10 in Figure 6, showing in elevation the rolls for separating the free ends of the adjacent individual match blanks of each leaf;

Figure 11 is a vertical longitudinal sectional view, taken through the mechanism for transferring the leaves from the forming mechanism to the conveyor, and, also, taken through the ejector, looking toward the machine in the same direction as in viewing Figure 1;

Figure 12 is a vertical sectional enlargement view of the ejector;

Figure 13 is a plan view of that portion of the machine shown in Figure 11, parts being in section on the line 13—13 in Figure 11;

Figure 14 is a plan view of the transferring mechanism on a larger scale, parts of the auxiliary or transferring conveyor being broken away;

Figure 15 is a fragmentary longitudinal vertical sectional view taken on the line 15—15 in Figure 17, showing details of the conveyor belt and the drive wheel and track connection thereto;

Figure 16 is a fragmentary longitudinal vertical sectional view taken on the line 16—16 in Figure 14, exhibiting in detail the mode of transferring the match leaves to the individual holders of the conveyor;

Figures 17 and 18 are transverse vertical sectional fragmentary views taken on the lines 17—17 and 18—18, respectively, in Figure 16;

Figure 19 is a plan view of the means for applying paraffin to the free ends of the individual blanks of the match leaves, the conveyor for the leaves being omitted for the sake of clearness;

Figure 20 is a longitudinal vertical central sectional view through the paraffin applying means;

Figure 21 is a plan view of the means for applying ignition composition to the free ends of the individual blanks of the leaves, and showing, also, fragments of that end of the machine beyond the said composition-applying means, the conveyor for the leaves being omitted for the sake of clearness;

Figure 22 is a longitudinal vertical central sectional view through the same; and Figure 23 is a detail view of the ejector similar to Figure 12, but showing the ejector in the final phase of its ejecting movement.

Figure 1:
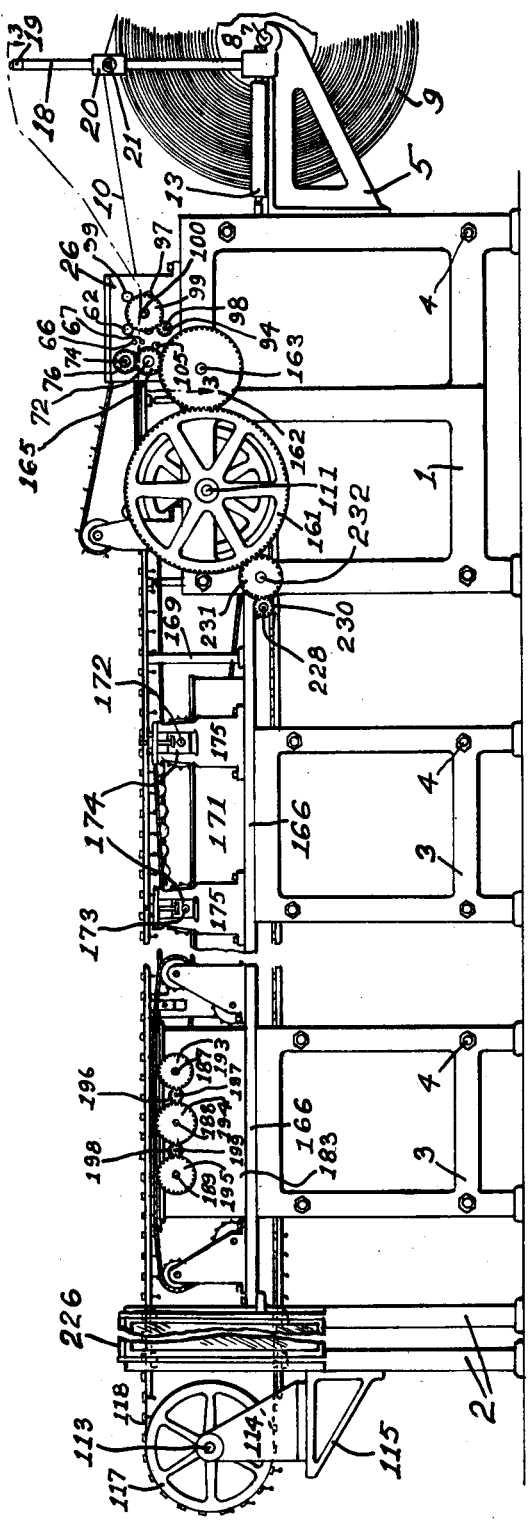

A pair of vertically and longitudinally extending frames 1 are arranged on opposite sides of the machine and shown at the right end thereof in Figure 1. A longitudinal series of vertically and transversely extending frames 2 are arranged at the left end of the machine in spaced-apart relation to one another. A longitudinal series of vertically and longitudinally extending frames 3 are arranged on each side of the machine directly opposite to the similar frames 3 on the other side of the machine, and intermediately of the frames 1 and 2. The pair of frames 1 and each pair of opposing frames 3 are connected together in spaced-apart relation by means of suitable stay rods 4. A pair of opposing brackets 5 are secured to the right end of each of the frames 1, respectively.

Open-topped alined bearings or rests 6 are provided at the right end of each of the brackets 5, respectively, to receive the respective ends of an axle 7, passing through the core or center 8, of the roll 9 of the cardboard strip or leaf stock 10, from which the match-book leaves are formed. The axle 7 preferably carries ball bearings 11, which fit into suitable recesses 12 therefor in the rests 6, as best shown in Figures 3 and 4. The roll 9 is guided against lateral displacement by means of rolls 13, engaging opposite sides thereof and turning freely on the rods 14, preferably through the intervention of ball bearings. The inner ends of the rods 14 are pivoted to studs 15, secured to a bar 16, attached to the frames 1; and the outer ends of the said rods are adapted to rest in recesses or seats 17 therefor in the brackets 5. Rods 18 project vertically upward from the brackets 5 adjacent the seats 17, and are connected at their upper ends by a cross-bar 19. Sleeves 20 are slidable on the rods 18, and may be held in predetermined position thereon by means of set-screws 21, threading laterally through the sleeves 20 and adapted to bear on the rods 18. A shaft 22 is supported at its ends in inwardly projecting bosses 23 on the sleeves 20; and a roll 24 is adapted to turn freely on the shaft 22, preferably through the intermediacy of ball bearings 25.

Opposing frames 26 are mounted respectively on the right portions of the frames 1, and support the means therebetween for forming the match-book leaves from the strip of leaf stock 10. The said forming means comprises means for incising successive portions of the strip 10 to define therefrom the match-book leaves, comprising the individual adjacent match blanks united at one end and free at the other; and it preferably, also, comprises means for spacing apart the free ends of the adjacent individual match blanks so that the ends of the latter may be freely exposed all around to the paraffin and ignition composition to be subsequently applied thereto.

The incising means includes a pair of rolls 27 and 28, mounted one above the other at the right portion of the frames 26 so as to operate conjointly on opposite sides of the strip 10 to form a longitudinal series of groups of parallel longitudinally extending slits 29, which separate the laterally adjoining individual match blanks 30, as best shown in Figures 3, 5, and 6. Each of the rolls 27 and 28 is provided on its peripheral face with a series of circumferentially extending alternately wide and narrow grooves 31 and 32, respectively, which are alined respectively with the narrow and wide grooves 32 and 31 of its mate. The bottoms of the grooves 31 and 32 are preferably concave-arcuate in cross-section so as to compress the match blanks therebetween into a substantially round cross-section. The grooves 31 are preferably one hundred twenty-five one-thousandths of an inch wide and thirty one-thousandths of an inch deep; the grooves 32 are preferably one hundred eighteen one-thousandths of an inch wide and twenty-five one-thousandths of an inch deep; and the annular face of the ridges 33, interposed between adjacent grooves, is preferably seven one-thousandths of an inch wide. Otherwise stated, the annular faces of the ridges 33 are terminated laterally by edges 34 that are spaced seven one-thousandths of an inch apart. The proportions of the several dimensions relatively to one another, and the positions of the grooves of one roll relatively to those of the other are best shown in the enlarged sectional view of Figure 7. It will be observed that the edges 34 that define the width of the narrow grooves 32 are inactive, but that those edges 34 of the ridges 33 in either roll which define the width of the wider grooves 31 co-operate in cutting with the corresponding edges 34 of its mate which likewise define the width of the wider grooves 31 of its mate, so that the ridges 33 of one roll are staggered with relation to the corresponding co-operating ridges 33 of its mate. Otherwise stated, the ridges of either roll lie in planes that adjoin the planes of the corresponding ridges of the other roll, whereby the ridges of either roll co-operate with the wider grooves of the other so that a true shearing action is obtained, spreading the adjacent match blanks formed thereby into alternately opposite directions by reason of the different depths of adjacent grooves. Correct lateral alinement of the rolls relatively to one another is assured by reason of the engagement of the annular flanges 35 of the roll 28 with the annular grooves 36 of the roll 27. Roll 28 is provided with opposite ends 37 of spindle formation, journaled in stationary bearings 38 in the frames 26, and roll 27 is provided with ends 39, of spindle formation, and journaled in bearings 40, which may be adjusted to suitably space the rolls apart. The roll 27 is adjusted so that its cutting edges 34 nearly meet, but never touch, the co-operating cutting edges 34 of its mate 28, the alined edges being spaced, say, about two one-thousandths of an inch apart. This slight separation of the rolls 27 and 28 prevents such wear of the cutting edges as is inevitable when two cutting edges engage one another, while, at the same time, it is not sufficient to prevent the formation of slits which extend entirely through the full thickness of the strip of stock. That the adjacent splints or match blanks will be detached from one another along their lateral edges even though the co-operating cutting edges of the opposing rolls do not meet will be more readily comprehended when it is understood that the stock from which the leaves are formed is approximately three sixty-fourths of an inch thick, and that when stock of such thickness is crushed between cutting edges that are only two one-thousandths of an inch apart, any uncut fibers of this coarse stock will have become so loosened or deformed and weakened that they will no longer be able to maintain a connection between the adjacent splints, having become nothing more than mere loose scuff. One of the rolls, preferably the lower roll 28, is fluted longitudinally on its annular face at intervals, as at 41, to interrupt the continuity of its cutting edges, so that unslitted portions 42 remain on the strip 10 between successive groups of slits 29. The rolls 27 and 28 are preferably run at the same peripheral speed by means of intermeshing gears 43 and 44, affixed to spindle stems 37 and 39, respectively.

It will be observed that, since the grooves 31 and 32 present transversely concaved bottoms, the strip of leaf stock 10 operated upon thereby must be of a thickness that is especially suited to the size of the opening between the co-operating grooves of the opposing rolls 27 and 28 in order to produce the match blanks with rounded cross-sections. It is, therefore, apparent that for materially different thicknesses of the stock 10, different rolls 27 and 28 must be employed, having grooves whose dimensions are especially adapted to the particular thickness of stock to be operated upon. The modified forms of slitting rolls shown in Figure 8 each present a series of annular grooves 45 and ridges 46 which are alined respectively with the annular ridges 46 and grooves 45 of its mate. It will be observed that this form, although not adapted for producing match blanks of rounded cross-section, is suitable for use on strips of leaf stock of varying thicknesses, since the grooves may be deep enough to accommodate any thickness of stock. In this form, also, the ridges or flanges 46 of either roll nearly meet, but do not enter, the grooves 45 of its mate, so that the wear of the cutting edges is reduced as in the other form. Since the grooves 45 of one roll are in staggered relation to the grooves 45 of the other roll, the adjacent match blanks must obviously be biased in opposite directions to produce a row of elevated blanks that alternate with a row of depressed blanks.

The incising means, also, includes a pair of rolls 47 and 48, mounted one above the other in advance of the rolls 27 and 28, and adapted to operate conjointly and on opposite sides of the strip 10 to incise the strip transversely at intervals 49 to define successive matchbook leaves 50 from one another, as exhibited by Figures 3, 5, and 9. Upper roll 47 is grooved longitudinally in its periphery to provide a series of sockets 51 for the cutter bars 52. Screws 53 pass through openings 54 in the bars 52 and thread into the roll 47, the heads 55 of the screws bearing against the shoulders 56 of the openings 54, and thus securing the bars in their sockets. A cutting edge 57 projects radially beyond the peripheral surface of the roll 47 from the anterior portion of each bar 52 and extends the full length of the bar to produce the transverse incisions hereinbefore referred to. Preferably one or more of the individual match blanks 30 are detached at intervals from the row of blanks in each leaf to provide spaces 58, that divide each row into a transverse series of groups of blanks, so that each leaf may be folded in alinement with the spaces 58 to form a plurality of superposed minor leaves. For this purpose, the series of short cutting edges 59 project radially beyond the peripheral surface of the roll 47 from the posterior portion of each of the bars 52. The lower roll 48 is preferably of rigid material, such as hardened steel, to provide a nonyielding surface to react against the pressure of the cutting edges of the roll 47. Lower roll 48 has its spindle-shaped ends 60 journaled in stationary bearings 61 in the frames 26; and upper roll 47 has its spindle-shaped ends 62 journaled in bearings 63 that are adjustable vertically in the frames 26. Bearings 63 are adjusted so that the cutting edges of roll 47 meet the surface of roll 48 with an intimacy sufficient to sever the stock 10 and yet not severe enough to produce undue pressure on the cutting edges, thereby materially reducing the wear of the latter. The cutting edges of roll 47 and the periphery of roll 48 revolve at the same peripheral speed as that of the cutting edges of rolls 27 and 28.

A third pair of rolls 64 and 65 are positioned one above the other in advance of the rolls 47 and 48 and are revolved at a peripheral speed preferably one and one-fourth times that of the rolls 47 and 48. The said rolls 64 and 65 are preferably formed of yielding elastic material, such as rubber, tightly encompassing their respective shafts 66 and 67, which are journaled respectively in bearings 68 and 69 in the frames 26. Rolls 64 and 65 engage opposite sides of the matchbook leaves 50, the forward edge of each leaf being drawn in by the said rolls as its rear edge is being incised by the rolls 47 and 48, and, since rolls 64 and 65 revolve at a greater peripheral speed than the rolls 47 and 48, they exert tension on the leaf upon which they are operating, tending to assist the rolls 47 and 48 in detaching the successive leaves from one another as they are being incised transversely. By reason of this action of the rolls 64 and 65, the severance of the leaves from one another is assured, even though the cutting action of the rolls 47 and 48 be slightly imperfect. Rolls 64 and 65, also, function to transfer the leaves from the rolls 47 and 48 to the spreading rolls 70 and 71; and, at the same time, because of their increased speed over that of the rolls 47 and 48, they separate successive leaves as they advance from the rolls 47 and 48 and present them to the rolls 70 and 71 in spaced-apart relation to one another.

Rolls 70 and 71 are positioned in advance of the rolls 64 and 65. Roll 71 is affixed to a shaft 72, journaled at its opposite ends in stationary bearings 73 in the frames 26; and roll 70 is affixed to a shaft 74, journaled in bearings 75, adjustable vertically in the frames 26. A gear 76, affixed to that portion of the shaft 74 that projects outwardly from that frame 26 that is shown in Figure 1, meshes with a gear 77, having the same number of teeth as the gear 76 and affixed to the shaft 72, so that rolls 70 and 71 revolve at the same angular velocities. A pair of sprocket wheels 78 are affixed to the shaft 74 at opposite ends of the roll 70 and at the inner sides of the frames 26. Respective sprocket chains 79 pass around the sprocket wheels 78 and around sprocket wheels 80 and 81 mounted farther towards the left in the machine as viewed in Figure 1, and to be more fully described hereinafter. Roll 71 preferably revolves at the same peripheral speed as that of rolls 64 and 65; and the pitch diameter of sprocket wheels 78 is preferably such that the speed of the chain 79 is equal to the peripheral speed of rolls 64, 65, and 71. Roll 71 presents a longitudinal series of annular flanges 82 that alternate with grooves 83 in its periphery. The roll 71 is fluted longitudinally at equally spaced intervals around its periphery, as at 84, to provide sharp edges 85 at the end of its flanges 82. Roll 70 is fluted longitudinally to form a series of radially projecting teeth 86. As the rolls 70 and 71 rotate, the respective teeth 86 of roll 70 are brought successively into registration with their corresponding grooves 83 in the roll 71. The teeth 86 are provided with a longitudinal series of circumferentially extending grooves 87 in their outer faces, forming intervening flanges 88, that are alined with the grooves 83 in the roll 71. Rolls 70 and 71 are so adjusted laterally with relation to rolls 27 and 28 that those individual match blanks that are biased downwardly during the slitting action of the rolls 27 and 28 will be subsequently bent downwardly by the spreading action of the rolls 70 and 71. A series of bars 89 are secured at intervals between the opposing chains 79, the said bars having their ends bent to form ears 90, that are riveted to the inner sides of the chains. As the chains pass around the sprockets, each of the bars 89 enters a respective one of the grooves 91, that extend longitudinally between the teeth of the roll 70. As the matchbook leaves 50 pass from rolls 64 and 65, they enter the space between one of the bars 89 and one of the rows of flanges 82 on the roll 71, as best shown in Figure 5. As the rolls continue to rotate, the flanges 88 of roll 70 descend on those match blanks 30 that are in alinement therewith and that alternate with other match blanks 30 that enter the grooves 87, depressing the first-mentioned blanks into the grooves 83 in the roll 71, and bending them at the point of their union with the stub portion or unslitted portion 42 of the leaves, such bending being facilitated by reason of the fact that the point of union is coincident with the sharp edges 85 on the flanges 82. Edges 85 engage the underside of the leaf to resist forward slippage of the leaf on the roll 71 under the pressure of the flanges 88 on the leaf. A pair of flanges 92 project outwardly from the anterior edge of each of the bars 89. As the leaf advances further between the rolls 70 and 71, the flanges 92 of that bar 89 that is descending behind the leaf engage the posterior or free ends of the individual blanks of the leaf and push the same forwardly from the rolls 70 and 71. Some of the flanges 82 preferably have portions cut away as indicated by the dotted lines in Figure 5 to provide clearance space for the projections 92 of the bars 89.

Figure 2:
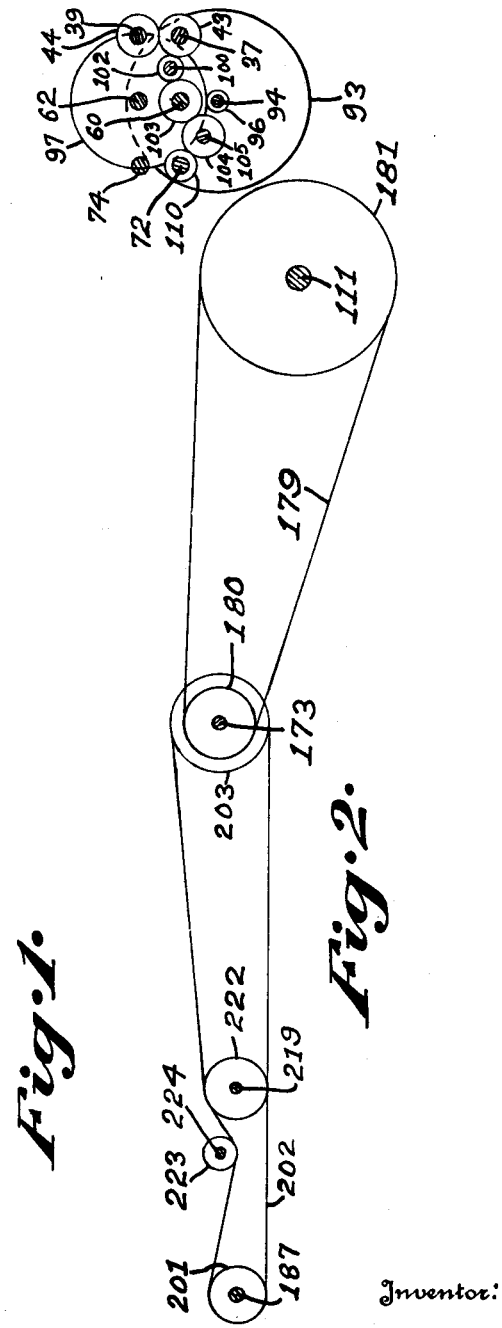
Figure 2 is a diagram of the gearing disposed on the side of the machine opposite to that shown in Figure 1, but viewed from the same side as Figure 1.

The machine may be driven in any suitable or usual manner, but as shown herein the power would be applied through the intervention of a belt to the pulley 93, arranged on that side of the machine opposite to the side shown in Figure 1, and affixed to a shaft 94, journaled in bearings 95 in the frames 26 under the bearings 61. The system of gearing is best illustrated in Figures 1 and 2. A pinion 96, preferably formed integral with the shaft 94 in juxtaposition to the inner side of the pulley 93, drives a gear 97, affixed to the shaft 62. A pinion 98, affixed to the other end of the shaft 94 at the outer side of the frame 26, drives gear 99, affixed to shaft 100, journaled in bearings 101 in the frames 26 intermediary of the bearings 38 and 61. A pinion 102 is affixed to the other end of shaft 100 and drives gear 43, on shaft 37, and gear 103, affixed to shaft 60. Gear 103 drives gear 104, affixed to shaft 105, journaled in bearings 106 in the frames 26. A gear 107, affixed to shaft 105, as best shown in Figure 5, drives pinion 108, affixed to shaft 67; and pinion 108 in turn drives pinion 109, affixed to shaft 66. Gear 104 drives gear 110, affixed to shaft 72. It will be observed that this system of gearing is so organized that, if pulley 93 be driven in a counter-clockwise direction as viewed in Figure 2, the upper rolls 27, 47, 64, and 70 will be driven in a clockwise direction as viewed in Figure 5, while the lower rolls 28, 48, 65, and 71 will be driven in a counter-clockwise direction, so that the stock will advance through the forming mechanism in the proper direction from right to left. It will be understood that the respective pitch diameters of the several gears are of such proportions to one another that the proper speeds of the several rolls with relation to one another as hereinbefore indicated will be assured, A shaft 111 is journaled in bearings 112, formed in the frames 1 in advance of the frames 26. Another shaft 113 is journaled at its opposite ends in a pair of bearing blocks 114, that are adjustable longitudinally on respective brackets 115, secured to the left side of that frame 2 that is farthest to the left, as shown in Figure 1. A pair of wheels 116 are affixed to the shaft 111 in juxtaposition to the inner sides of the frames 1, respectively; and a similar pair of wheels 117 are affixed to the shaft 113 adjacent the inner sides of the bearing blocks 114, respectively. Each of the wheels 116 is alined with a respective one of the wheels 117, and respective endless ribbons or belts 118, preferably in the form of steel tape, pass around each wheel 116 and its alined wheel 117. Blocks 119 are affixed to the outer sides of the tapes 118 at intervals that are equal to the intervals between the bars 89. The said blocks are preferably secured to the tapes by means of screw studs 120, that pass through perforations in the tapes and screw into tapped holes in the blocks, clamping the tapes between the blocks and the heads 121 of the screws, as shown in Figure 15. The blocks 119 are, also, provided with projections 122, that fit into other perforations in the tapes 118, so that pivotal movement of the blocks about the studs 120 is prevented. The wheels 116 and 117 are provided with sockets 123 in their peripheral faces to receive the heads 121 of the studs 120. The angular relation between the pair of oppositely disposed wheels on each shaft is such that the sockets 123 in each wheel are directly opposite the sockets 123 in its mate. Tracks 124 underlie and support the upper strands of each tape, and tracks 125 support the lower strands of each tape. Tracks 124 are provided with longitudinally extending grooves 126 in their upper faces to receive the heads 121 and thereby guide the tapes 118 against lateral displacement.

Holders 127 are carried at intervals between the tapes 118 and are adapted to receive the match-book leaves after their formation and to transport them in succession past the paraffining means, ignition composition applying means, drying means and ejecting means and then again to the receiving point, thus completing the circuit of their travel. Each of the holders 127 is preferably cast of aluminum to minimize its weight, and comprises an elongated bar portion 128, bearing trunnions 129 that project from its opposite ends and are journaled in loosely fitting bearings 130 in the blocks 119. One side of the portion 128 presents a face or seat 131 adapted for receiving the match-book leaves thereon. Arm portions 132 project from the bar portion 128 adjacent the trunnions 129 and extend parallel to the face 131. The arm portions 132 are weighted at their free ends by cylindrical enlargements 133 thereon, so that each holder, unless constrained against its freely pivotal movement about the bearings 130, is biased normally into the vertical positions shown in Figures 11, 20, and 22 by reason of its center of gravity being thus eccentrically disposed with relation to its trunnions 129. Pins 134 project from the face 131 adjacent each end of the holder. The said pins are preferably formed of hardened steel and are secured by friction or in any other suitable manner in sockets or holes extending through the bar portion 128 and through reinforcing bosses 135 formed on the opposite side of the bar portion 128. Slots or openings 136 are formed in the portion 128 on each side of each of the bosses 135 to permit access to the underside of the match-book leaves for the purpose of ejecting them from the face 131. The leaves are preferably ejected automatically by means that are to be described hereinafter.

The wheels 116 rotate in a counter-clockwise direction, and, as the holders 127 ascend therewith, they are deflected from their normal depending position into a position parallel to their path of travel, so that their faces 131 face upwardly as they reach the top of the wheels, as shown in Figures 11 and 16. The means for deflecting the holders 127 comprises a pair of tracks 137, disposed respectively in the planes of the paths described by the arms 132 of the holders 127, so that the ends 133 of the said arms ride on the said tracks 137. The left ends of tracks 137 are secured to and supported on a transverse bar 138, whose opposite ends are secured to and supported on posts 139, screwed into the frames 1. The upper screw-threaded ends of posts 139 pass through the bar 138, and the latter may be adjusted vertically thereon by means of the nuts 140. The intermediate portions of the holders 127 ride over and are supported on bars 141 (illustrated in Figure 17), arranged to engage the outer sides of the bosses 135 to prevent endwise movement of the holders 127 while the match-book leaves are being pressed over the pins 134 and against the faces 131 by the means to be presently described. Endwise play of the holders occurs normally because the tapes 118 are spread apart sufficiently to prevent binding of the holders between the blocks 119. The left ends of bars 141 are secured to and supported on bar 138. The right ends of bars 141 and of the tracks 137 are supported on arms 142, whose lower ends enlarge into bearings 143, in which the shaft 111 is adapted to rotate, and whose upper ends are secured to the tracks 137 and bars 141 by a stay bolt 144 that passes through the connected parts.

A transverse row of longitudinally extending bars 145 and 146 form a bridge which spans the gap between the rolls 70 and 71 and the holders 127 that are passing over the bars 141 and the tracks 137. Bars 145 and 146 are secured to and supported on transverse bars 147, secured at their opposite ends to posts 148, that are screwed into the frames 1. Bars 147 may be adjusted vertically by means of the nuts 149. Bars 146 extend nearly to the holders 127; while bars 145 terminate at the left transverse bar 147; and thin blades 150 extend from the bars 145 over the holders 127. Sprocket wheels 81 are affixed to a shaft 151, having its opposite ends journaled in bearings in the outer ends of arms 152, whose inner ends are affixed to a shaft 153, having its ends pivoted in pedestals 154, mounted on the frames 1. Sprocket wheels 80 are affixed to shafts 155, journaled in bearings in the upper ends of pedestals 154. The flanges 92 of the bars 89 are recessed in their outer edges, the retracted intermediate portion 156 of the edges being adapted to slide on the bars 146 so as to maintain the bars 89 in spaced relation to the bars 146 to provide ample space to accommodate therebetween the match-book leaves 50 without liability of distorting or crowding together the separated free ends of the alternate individual match blanks 30 of the leaves. The end portions 157 of the flanges 92 straddle the bars 146, and extend below the top face of the bars a distance sufficient to insure their continued engagement with the ends of the depressed blanks 30 of the leaves 50 after the flanges have advanced beyond the left ends of the bars 146. As the lower strand of the chain 79 advances, the flanges 92 of the bars 89 carried thereby push the leaves 50 over the bars 145 and 146 to positions over the simultaneously advancing holders 127, so that the stub portion 42 of each leaf 50 overlies the bar portion 128 of a respective holder; and, as the advance continues, the pins 134 of the holders 127 pierce the said stub portions, the leaves being pressed against the pins 134 and the face 131 by the bars 89, as best illustrated in Figures 11, 16, 17, and 18. Clearance openings 158 for the pins 134 are provided in the bars 89. Arms 152 are adjusted so that the sprocket wheels 81 carry the chains 79 and their bars 89 at a level such that the bars 89 will force the leaves 50 completely down the pins 134 to the faces 131. The arms 152 are fixed in their adjusted positions by means of clamping screws 159, passing through slots 160 in the arms 152, and screwing into the pedestals 154. Shaft 111 is rotated by a gear 161, affixed thereto at the outer side of the frame 1 shown in Figure 1. Gear 161 is driven by a gear 162, affixed to an idler shaft 163, journaled in bearings 164 in the frames 1, as shown in Figure 10; and gear 162 in turn is driven by gear 165, affixed to shaft 72.

Bars 166 extend from the frames 1 to that one of the frames 2 that is farthest to the right, as shown in Figure 1; and are supported on and secured to the frames 3 and the lugs 167, formed integral with the said frames 1 and 2. Upper tracks 124 are supported by and secured to bar 138, lugs 168 on the frames 2, and uprights or standards 169, mounted at intervals on the bars 166. Lower tracks 125 are secured to lugs 170, preferably cast integral with the frames 1, 2, and 3.

As the holders 127 advance from the sprocket wheels 151, the ends 133 pass beyond the forward end of tracks 137, permitting the holders and the leaves thereon to fall into the depending position suitable for treating the ends of the individual match blanks 30. A paraffin-holding tank 171 is bolted to the upper sides of the bars 166 directly over those frames 3 that are juxtaposed to the frames 1. A pair of transverse shafts 172 and 173 are journaled over opposite ends of the tank 171 in bearings 174, that are vertically adjustable in uprights or standards 175, bolted to the upper sides of the bars 166. A pair of sprocket wheels 176 are affixed to each shaft 172 and 173, and carry endless sprocket chains 177, to which are pivoted buckets 178, that dip into the paraffin in the tank 171 so as to become filled therewith, and then pass under the match-book leaves 50 so that the ends of the match blanks 30 of the said leaves are immersed therein. The bearings 174 are preferably so adjusted that the buckets on the upper strand of the chain 177 descend gradually as they pass from the sprocket wheels on the shaft 172 to the sprocket wheels on the shaft 173, thereby gradually withdrawing the paraffin in the buckets from the match blanks 30 that are immersed therein with resultant uniformity in the application of paraffin thereto. Chain 177 is driven so that each of the buckets 178 in its upper strand is always directly under a respective one of the advancing leaves 50. The means for driving the chain 177 comprises a sprocket chain 179, that passes around a sprocket wheel 180, affixed to the shaft 173, and around a sprocket wheel 181, affixed to the shaft 111 on that side of the machine not shown in Figure 1. The paraffin is kept in a molten condition by means of a coil 182, through which steam or any other suitable heating medium may be circulated in the well-known manner.

An ignition-composition holding tank 183 is bolted on the bars 166 directly over the left pair of frames 3 and under the holders 127 that pass thereover in the course of their advance from the tank 171, as illustrated in Figures 1, 21, and 22. Tanks 171 and 183 are spaced apart far enough to allow the paraffin that has been applied to the blanks 30 to solidify before the blanks reach the tank 183. A row of transverse rolls 184, 185, and 186 extends longitudinally in the tank 183. The rolls 184, 185, and 186 are affixed to shafts 187, 188, and 189, respectively, whose ends are journaled in bearings in the side walls 190 and 191 of the tank 183. Rolls 184, 185, and 186 are preferably formed of steel and covered with a tightly fitting layer of rubber 192 around their peripheries. Gears 193, 194, and 195 are affixed to the shafts 187, 188, and 189, respectively, adjacent the outer side of the wall 190, on that side of the machine that is seen in Figure 1. Gear 193 drives gear 194 through the intermediacy of a pinion 196, that idles on a stationary stand or stub shaft 197, affixed to the wall 190. Gear 194 drives gear 195 through the intermediacy of a pinion 198, that idles on a stub shaft 199, affixed to the wall 190. Collars 200, affixed to said stub shafts, retain said gears thereon. Shaft 187 is driven by a sprocket wheel 201, affixed to that portion of the shaft 187 that projects outside of the wall 191. Sprocket wheel 201 is driven by sprocket chain 202, driven by sprocket wheel 203, affixed to the shaft 173. The component elements of the said system of gearing are of such proportions to one another and so arranged that the rolls 184, 185, and 186 rotate in a counter-clockwise direction and at different peripheral speeds, the peripheral speed of roll 184 being preferably greater than the speed of the tapes 118 and the holders 127, the peripheral speed of roll 185 being less than the speed of the tapes and holders, and the peripheral speed of roll 186 being equal to the speed of the tapes and holders. Ignition composition is placed in the upper chamber 204 of the tank 183 in sufficient quantity to reach the rolls 184, 185, and 186. As the rolls rotate, the composition adheres to and collects on their rubber castings 192 and is carried around therewith up under the separated ends of the individual blanks 30 of the leaves 50 that are advancing over the said rolls and dip into the layer of composition thereon. Roll 184 tends to apply the composition to the posterior side of the blanks 30 because it exceeds the speed of the latter; roll 185 tends to apply the composition to the anterior side of the blanks because its speed is exceeded by that of the blanks; and roll 186 tends to apply the composition evenly to both sides of the blanks because its peripheral speed is equal to the speed of the blanks 30. It will, therefore, be manifest that by the conjoint action of the three rolls the composition is uniformly applied to all sides of the end portions of the blanks 30. A suitable medium, such as steam, is supplied to the lower chamber 205 of the tank 183 to heat the ignition composition in the upper chamber 204 to a suitable consistency, as will be understood by those skilled in the art. The thickness of the layers that collect on the rolls may be adjusted as desired by turning the baffle plates 206 so that the opening between each roll and the upper end of its adjacent plate corresponds to the desired depth of the layer. Baffle plates 206 are secured to stems 207 arranged transversely in the tank 183 and passing through sockets or bearings provided therefor in the walls 190 and 191. When the baffle plates have been adjusted, they may be secured in their adjusted positions by means of set screws 208, that screw into the upper end of the walls 190 and 191 and are adapted to bear on the stems 207. Means are preferably provided to constrain the depending holders 127 against their tendency to swing about their freely turning trunnions 129 while passing over the rolls 184, 185, and 186. Such means comprises a chain 209, passing over a track 210 that is secured to the top of the tank 183, and provided with depressions or sockets 211, that are adapted to seat against the ends 133 of respective holders 127 that overlie the said depressions and move simultaneously therewith. Chain 209 passes around upper and lower sprocket wheels 212 and 213, respectively, at the left end of the tank 183, and around upper and lower sprocket wheels 214 and 215, respectively, at the right end of the tank 183. Sprocket wheels 212 and 213 are affixed to shafts 216 and 217, respectively, having their opposite ends journaled in bearings in uprights or standards 218, bolted to the bars 166. Sprocket wheels 214 and 215 are affixed to shafts 219 and 220, respectively, having their opposite ends journaled in uprights or standards 221, bolted to the bars 166. Shaft 219 has affixed thereto a sprocket wheel 222, that meshes with and is driven by sprocket chain 202, and that is so proportioned to the wheel 214 that the ends 133 of the holders fit into and move simultaneously with the depressions 211 in the chain 209. An idler sprocket 223, adapted to turn on a stub shaft 224, affixed to a slide 225, adjustable vertically in the upright 221, meshes with the chain 209 and is adjusted to take up any slack in the chain.

The holders 127 advance from the tank 183 and pass through a drier 226, then reverse their course as the belts 118 pass around the wheels 117 beyond the left end of the drier, and then re-enter the drier and pass therethrough and under the tanks 183 and 166. The drier preferably comprises a casing borne by the frames 2 and including glass panels for observation purposes, and is of sufficient length to allow ample time for drying or solidifying the ignition composition on the ends of the blanks 30. Air is blown through the drier 226 mechanically to remove vapor and hasten the drying process.

As the holders 127 pass under tank 183, their ends 133 encounter tracks 227, which deflect the holders into an inverted position so that the faces 131 of the holders face downward. The holders continue to advance in this position from left to right until they reach the wheels 116, where they resume their depending position by reason of the termination of tracks 227. Tracks 227 are supported on and secured to lugs 170 on the frames 1 and on lugs 168 on the frames 3. While the holders are advancing in the inverted position, they pass under a shaft 228, having its opposite ends journaled in bearings in the lugs 167 that project from the frames 1. Pins 229 pass through and project transversely from opposite sides of the shaft 228, being secured therein by means of a tight fit or in any other suitable manner. Shaft 228 is rotated in a counter clockwise direction by a pinion 230, affixed thereto and driven by a gear 231, affixed to an idler shaft 232, journaled in bearings in the frames 1, gear 231 in turn being driven by gear 161, affixed to shaft 111. The said gearing is so arranged that the shaft 228 makes one half of a revolution as the holders shift their position one interval, and so that each end of the pins 229 alternates with the other end in entering the slots 136 of successive holders to engage the undersides of the leaves 50 and thereby eject them from the holders, as best shown in Figure 12.

If desired, the strip 10 to be fed to the rolls 27 and 28 may be slightly wider than the width of the finished leaves, so that scrap 233 may be cut from the lateral edges by the rolls 27 and 28 to compensate for any inaccuracy in the alinement of the strip as it enters the rolls 27 and 28, as shown in Figure 3. Or, if desired, guides 234 may be arranged along the edges of the strip 10 at the point of its entry between the frames 26 in order to insure accuracy of alinement of the strip with relation to the rolls 27 and 28.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. In a machine for making match-book leaves, the combination of means for advancing a strip of leaf stock continuously and incising the same while so advancing to form a series of successively advancing adjoining match-book leaves, each of which embodies a plurality of adjoining individual match splints united at one end; a pair of rolls adapted to separate the free ends of adjoining splints; and another pair of rolls interposed between said first-mentioned means and said splint-separating rolls and adapted positively to transfer the leaves from the said incising means to the said separating rolls without interrupting the continuous advance of the said leaves.

2. In a machine for making match-book leaves, the combination of means for advancing a strip of leaf stock and incising successive portions of the same while they are advancing to form a series of match-book leaves, each of which embodies a plurality of adjoining individual match splints free at one end; means adapted for seizing the end of the stock as it advances from the said incising means and tending to advance the same at a greater speed, whereby successive leaves are spaced apart from one another; means for separating the free ends of adjoining splints of the spaced-apart advancing leaves; and means adapted to engage the leaves to continue further the advance of the same.

3. In a machine for making match-book leaves, the combination of means for advancing a strip of leaf stock continuously and operating upon successive portions of the same while they are advancing to form a series of match-book leaves, a continuously moving conveyor provided with pins adapted to perforate and hold the said leaves, and continuously advancing means for transferring the said leaves from the said operating means to predetermined positions on the said conveyor and impressing the leaves against the said pins.

4. In a machine for making match-book leaves, the combination of means for advancing a strip of leaf stock and operating upon successive portions of the same to form a series of match-book leaves, a conveyor adapted to hold the said leaves positively in predetermined positions thereon, a bridge intervening between said forming means and said conveyor, and an auxiliary conveyor riding over the said bridge and overlapping the first-mentioned conveyor and adapted to positively slide the leaves from the said means over the said bridge to predetermined positions between the overlapping portions of the said conveyors.

5. In a machine for making match-book leaves, the combination of means for advancing a strip of leaf stock and operating upon successive portions thereof to form a series of match-book leaves, an endless conveyor adapted to receive the said leaves, and an auxiliary endless conveyor overlapping the first-mentioned conveyor and bearing projections adapted to engage the leaves before they are released from the said operating means and to move them positively from the said means to predetermined positions between the overlapping portions of the said conveyors.

6. In a machine for making match-book leaves, the combination of means for advancing a strip of leaf stock and operating upon successive portions thereof to form a series of match-book leaves, an endless conveyor provided with pins adapted to pierce and hold the said leaves, and an auxiliary endless conveyor overlapping the first-mentioned conveyor and bearing projections adapted to engage the said leaves to move them positively from the said means to predetermined positions over the said pins between the overlapping portions of the said conveyors, the said auxiliary conveyor, also, being adapted to press the said leaves against the said pins.

7. In a machine for making match-book leaves, the combination of means for advancing a strip of leaf stock and operating upon successive portions of the same to form a series of match-book leaves, the said means including a rotary element operating upon one side of the said stock, and an endless conveyor passing around the said element and adapted to push against the said leaves to continue the advance of the latter.

8. In a machine for making match-book leaves, the combination of means for advancing a strip of leaf stock and operating upon successive portions of the same to form a series of match-book leaves, the said means including a rotary element operating upon one side of the said stock, an endless conveyor disposed in spaced relation to the said operating means and adapted to receive the said leaves, a bridge spanning the gap between the said operating means and the said conveyor and over which the leaves may slide from the former to the latter, and an auxiliary endless conveyor passing around the said element and over the said bridge and the said first-mentioned conveyor and adapted to engage the said leaves to continue the advance of the same over the said bridge and to transfer them to the said first-mentioned conveyor.

9. In a machine for making match-book leaves, the combination of means for advancing a strip of leaf stock and incising successive portions of the same to form a series of match-book leaves, each of which embodies a plurality of adjoining individual match splints free at one end, a pair of co-operating rotary elements adapted to engage opposite sides of the said leaves to separate the free ends of adjoining splints, and an endless conveyor passing around one of the said elements and adapted to push against the said leaves to continue the advance of the latter.

10. In a machine for making match-book leaves, the combination of means for advancing a strip of leaf stock and incising successive portions of the same to form a series of match-book leaves, each of which embodies a plurality of adjoining individual match splints united at one end, a pair of co-operating rotary elements adapted to engage opposite sides of the said leaves to separate the free ends of adjoining splints, an endless conveyor disposed in spaced relation to the said elements and adapted to receive the said leaves, a bridge spanning the gap between the said elements and the said conveyor and over which the leaves may slide from the elements to the conveyor, and an auxiliary endless conveyor passing around one of the said elements and over the said bridge and the said first-mentioned conveyor and adapted to engage the said leaves to continue the advance of the same over the said bridge and to transfer them to the said first-mentioned conveyor.

11. In a match-making machine, a conveyor comprising a pair of spaced-apart parallel tracks, a pair of tapes each of which is adapted to slide longitudinally over a respective track and bears projections co-operating with the track to be guided thereby, and match holding means having each of its opposite ends borne by a respective tape.

12. In a match-making machine, a conveyor comprising a pair of spaced-apart parallel tracks presenting longitudinal grooves in corresponding sides, a pair of tapes each of which is adapted to slide longitudinally over the grooved side of a respective track and bears projections engaging the said groove, and match holding means positioned intermediary of and borne by the said tapes.

13. In a match-making machine, a conveyor comprising a pair of spaced-apart parallel longitudinally-movable tapes, means for guiding and supporting the same, a longitudinal series of blocks borne at intervals by each of the said tapes, and match-holding means having its opposite ends pivoted to the corresponding blocks of the respective tapes.

14. In a match-making machine, a conveyor comprising a drive wheel having a series of laterally closed indentations in its periphery, a tape engaging the said periphery and bearing a series of projections adapted to enter the said indentations so as to drive the tape within lateral limits, and match holding means borne by the said tape.

15. In a match-making machine, a conveyor comprising a pair of spaced-apart parallel tracks, a pair of spaced-apart parallel drive wheels, each having a series of indentations in its periphery, a pair of tapes, each of which passes over a respective track and drive wheel periphery and bears a series of projections adapted for engagement with the said indentations for the purpose of driving the tape and for engagement with the track for the purpose of guiding the tape, and match holding means positioned intermediary of and borne by the said tapes.

16. In a match-making machine a conveyor comprising a drive wheel having a series of laterally closed indentations in its periphery, a tape having one side engaging the said periphery, a series of blocks borne on the other side of the said tape, elements securing the said blocks to the said tape and projecting from the opposite side of the tape to enter the said indentations for the purpose of driving the tape within lateral limits, and match holding means pivoted to the said blocks.

17. In a match-making machine, a conveyor embodying a pair of spaced-apart parallel tapes, each having a longitudinal series of apertures, a series of blocks adapted for connection to match holding means and disposed on a side of the tapes, and fastening members each bearing against the other side of the tapes and extending through a respective aperture and engaging a respective block to clamp the same against the said tapes, match-holding means positioned intermediary of said tapes and pivoted to corresponding blocks on the respective tapes, and means engaging said fastening members to drive said tapes.

18. In a match-making machine, a tape for the purpose set forth and provided with a longitudinal series of apertures, a series of blocks disposed on a side of the tape and each having an opening registering with a respective aperture and a bearing arranged transversely to the said aperture and the said tape and having its ends disposed on opposite sides of the center of the said opening, and a series of fastening members, each passing through a respective aperture and a corresponding opening of one of said blocks and adapted to secure the said block to the said tape.

19. In a match-making machine, a tape for the purpose set forth and provided with a longitudinal series of apertures, a series of blocks disposed on one side of the tape and each having a screw-threaded opening registering with a respective aperture and a journal-bearing opening arranged transversely to the said aperture and the said tape, and a series of studs, each having a head bearing against the other side of the tape and a screw-threaded shank passing in unthreaded relation through a respective aperture and screwing into a corresponding screw-threaded opening to bind the block against the said tape, the said head being of tooth formation to engage a drive wheel having tooth-receiving sockets.

20. In a machine for making match-book leaves, the combination of a traveling leaf-holder bearing means adapted to enter the leaves to hold the same and means for positively ejecting the leaves from the said means in the course of its traveling movement.

21. In a machine for making match-book leaves, the combination of a series of leaf-holders traveling continuously and in tandem relation to one another and bearing means adapted to enter the leaves to hold the same and means for positively ejecting the leaves from each of said holders in succession during the traveling movement of such holder.

22. In a machine for making match-book leaves, the combination of a continuously moving conveyor adapted to carry match-book leaves, means for forming the leaves and transferring them to the conveyor in predetermined positions thereon while the conveyor is moving, and means for subsequently ejecting the leaves from the conveyor while the latter is in motion.

23. In a machine for making match-book leaves, the combination of a conveying member, a leaf-holder freely pivoted thereto so that the leaf held thereby normally depends therefrom and adapted to enter the leaves to hold the latter, means for ejecting the leaf from the holder, and means for constraining the freely pivotal movement of the holder while the leaf is being ejected therefrom.

24. In a machine for making match-book leaves, the combination of a continuously moving conveying member, a leaf-holder freely pivoted thereto, means for transferring a leaf to the said holder while the member is moving, means for ejecting the leaf from the holder while the member is moving and means for constraining the freely pivotal movement of the holder while the leaf is being transferred thereto and ejected therefrom.

25. In a match-making machine, the combination of a traveling member, a match holder that presents a face adapted to receive a match and that is pivoted to the said member so that the match held thereby normally depends therefrom, means for tilting the holder so that the match receiving face faces upwardly at a point in the travel of said member, means for tilting the holder so that the match receiving face faces downwardly at a later point in the travel of said member, means intermediary of the said two points for treating the depending end of the match, and means for ejecting the match downwardly from the said face of the holder while the latter is positioned with said face presented downwardly.

26. In a machine for making match-book leaves, a holder for a match-book leaf having a face for receiving said leaf and a pin projecting from the said face and adapted to pierce the leaf, the said face being recessed in juxtaposition to the said pin to permit access to the underside of the leaf for the purpose of ejecting the leaf from the holder.

27. In a match-making machine, a conveyor, a series of match blank holders freely pivoted thereto so that the free ends of the blanks normally depend therefrom and having normally depending arms, means disposed under the conveyor for applying ignition composition to the depending ends of the blanks, and means traveling with and in juxtaposition to and adapted to engage the depending arms of the holders as they pass over the ignition composition applying means so as to constrain the freely pivotal movement of a holder while the composition is being applied to the ends of the blanks held thereby.

28. In a machine for making match-book leaves, the combination of means for forming match-book leaves in sequence, a train of continuously advancing holders adapted to receive the said leaves, and means for transferring successive leaves from the said forming means to corresponding successive holders while the latter are advancing, the said transferring means being adapted to engage the leaves securely to prevent slippage of the leaves from predetermined positions thereon, and to follow closely behind the leaves before the latter are released from the said forming means.

29. In a machine for making match-book leaves, the combination of means for forming match-book leaves in sequence, a train of continuously advancing holders adapted to receive the said leaves, and means for transferring successive leaves from the said forming means to corresponding successive holders while the latter are advancing, the said means bearing projections adapted to engage the said leaves and to follow closely behind the leaves before the latter are released from the said forming means.

30. In a machine for making match-book leaves, the combination of an elongated member forming a bridge over which the leaves may be slid; and pushing means ridable over and beyond the end of the said member and presenting a face arranged transversely of the elongated member and extending upwardly therefrom so as to engage the free ends of splints of the leaves arranged in superposed rows, the said face, also, extending laterally of the member and depending sufficiently below the underside of the lower row of splints whereby continued engagement of the said face with the ends of the splints is assured after said splint ends have passed beyond the end of the said member and dropped below the upper face of the said member.

31. In a machine for making match-book leaves, the combination of an elongated member forming a bridge over which the leaves may be slid, a plurality of pushing devices straddling the said member and adapted to engage the rear edge of the leaves to advance the same along the said member, and means for moving said pushing devices sequentially and continuously over the said bridge member.

32. In a machine for making match-book leaves, the combination of means for advancing a strip of leaf stock and operating upon successive portions thereof to form a series of match-book leaves, a conveyor adapted to hold the said leaves positively when they are impressed in predetermined positions thereon, and an auxiliary conveyor overlapping the first-mentioned conveyor and adapted positively to advance the leaves from the said means to predetermined positions between the overlapping portions of the said conveyors and to impress the leaves in said positions on the first-mentioned conveyor.

33. In a machine for making match-book leaves, the combination of means for advancing a strip of leaf stock and operating upon successive portions thereof to form a series of match-book leaves, a conveyor adapted to hold the said leaves positively when they are impressed in predetermined positions thereon, and a plurality of pushing devices traveling in sequence from said means to said conveyor, each of said devices being adapted to overlie a leaf and to impress the same on the said conveyor and to push the leaf that underlies the preceding device.

34. In a machine for making match-book leaves, the combination of means for advancing a strip of leaf stock and operating upon successive portions thereof to form a series of match-book leaves; a conveyor disposed in spaced relation to the said means and adapted to hold the said leaves when the latter are impressed thereon; a bridge spanning the gap between the said means and the said conveyor; and a plurality of pushing devices traveling in sequence from the said means over the said bridge to the said conveyor, each of said devices having a portion adapted to overlie a leaf and to impress the same on the said conveyor, and a portion adapted to push the leaf that underlies the preceding device, the said devices being adapted to ride over the said bridge, so that the impressing portions of the devices are elevated out of engagement with the leaves that underlie them.

35. In a match-making machine, a tape for the purpose set forth and provided with a longitudinal series of apertures; a series of blocks disposed on one side of the tape and each having an opening registering with a respective aperture, a bearing arranged transversely to the said aperture and the said tape, and an integral boss projecting from the side adjacent to the tape and entering an aperture of the tape; and a series of studs, each having a head bearing against the other side of the tape and a shank passing through a respective aperture and into a corresponding opening and engaging the block thereof to bind the same against the said tape.

36. In a machine for making match-book leaves, a holder for a match-book leaf having a face for receiving said leaf and a pin projecting from the said face and adapted to enter the said leaf, the said face being recessed on opposite sides of the pin to permit access to the underside of the leaf for the purpose of ejecting the leaf from the holder by exerting pressure on the leaf symmetrically with relation to the pin.

37. In a machine for making match-book leaves, a holder for a match-book leaf having pivotal ends and a pair of leaf-retaining conformations disposed, respectively, on opposite sides of the middle of said holder, and being recessed in juxtaposition to the said conformations to afford access to the underside of the leaf for the purpose of ejecting the leaf from the holder.

38. In a machine for making match-book leaves, a holder for a match-book leaf having pivotal ends and a pair of pins disposed, respectively, on opposite sides of the middle of said holder, and being recessed on opposite sides of each pin to afford access to the underside of the leaf for the purpose of ejecting the leaf from the holder by exerting pressure on the leaf symmetrically with relation to the pins.

39. In a machine for making match-book leaves, a holder for a match-book leaf having pivotal ends, a pin projecting from one face of the holder intermediary of said ends, a pair of notches in an edge of the holder and on opposite sides of the pin, and a boss on the opposite face of the holder intermediary of said notches and embracing said pin.

40. In a machine for making match-book leaves, a traveling holder for a match-book leaf having a face presenting a conformation adapted to retain a leaf thereon and being recessed in juxtaposition to the said conformation, and an ejector presenting an arm adapted to travel with the holder while entering the recess to engage the next-to-the-holder side of the leaf to eject the latter while the holder is traveling past said ejector.

In testimony whereof I hereunto affix my signature.

CONSTANTINE N. NEKLUTIN.